Inventor
Robert E. Barber
By Hofgren, Wegner,
Allen, Stellman & McCord Att'ys

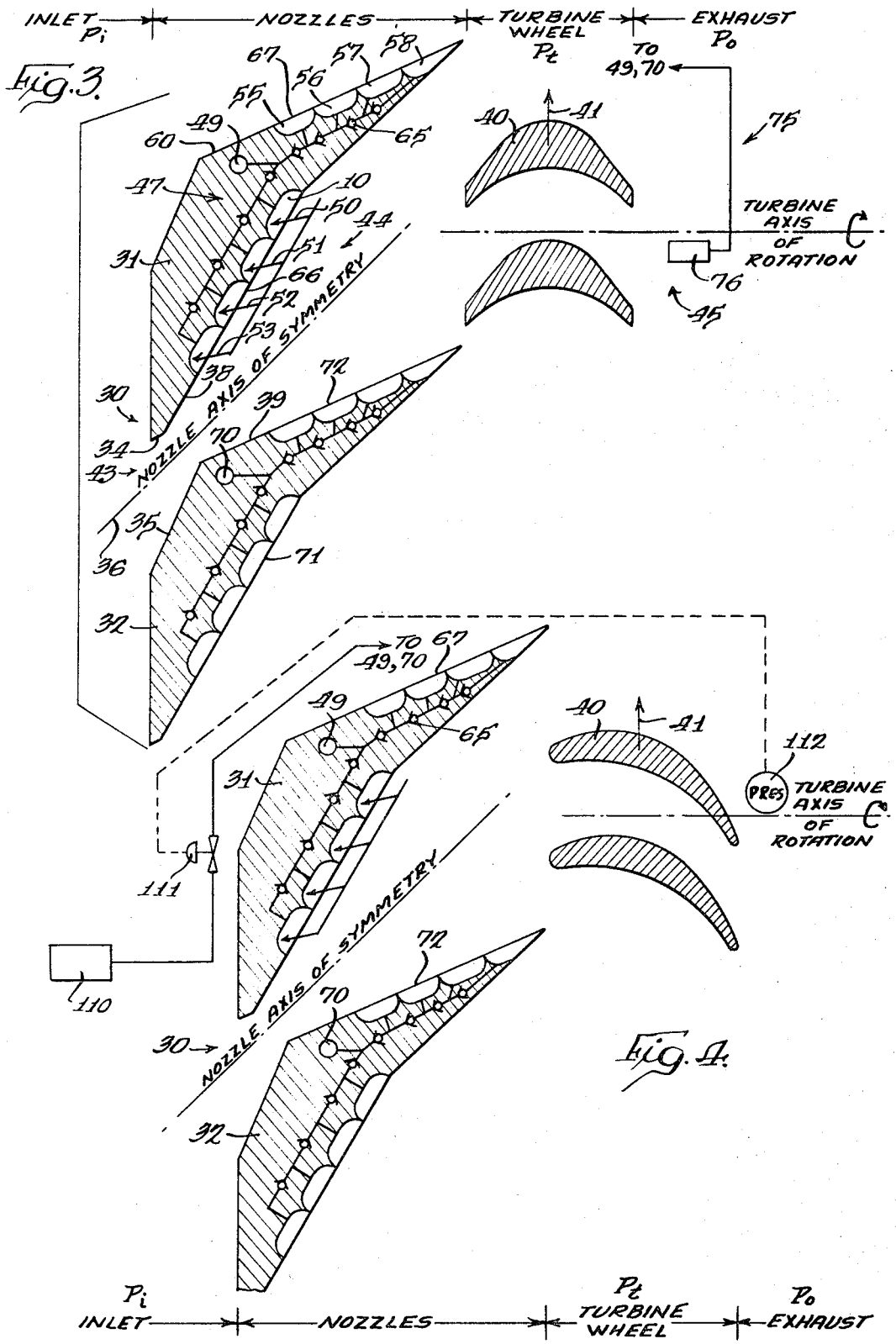

United States Patent Office 3,403,890
Patented Oct. 1, 1968

3,403,890
TURBINE
Robert E. Barber, Arvada, Colo., assignor to Sundstrand Corporation, a corporation of Delaware
Filed July 15, 1965, Ser. No. 472,227
12 Claims. (Cl. 253—59)

ABSTRACT OF THE DISCLOSURE

A turbine having supersonic nozzle velocities wherein each nozzle has diverging exit surfaces with the surfaces having passages therethrough for admitting control fluid to vary the boundary layer on the surfaces in response to variations in turbine back pressure, the passages in one of the surfaces providing a greater flow of control fluid to one surface to also vary the nozzle exit flow direction as the turbine back pressure varies.

---

This invention relates generally to rotary turbines and more particularly to a turbine having a variable expansion ratio and variable exit angle nozzles.

In turbines of the impulse and reaction type which are designed to operate at large pressure ratios, the velocity of fluid flow in the turbine nozzles may be supersonic. The turbine nozzles and blades are designed to achieve maximum efficiency at some predetermined pressure ratio. If such a turbine is operated at a pressure ratio below the design pressure ratio, a significant decrease in performance results. This loss in the turbine performance is very significant in systems designed to operate in missiles since the turbine pressure ratio varies over a wide range because of the variation in back pressure from about 15 p.s.i.a. on the ground to essentially zero in space. If the turbine was designed to operate under a back pressure of 15 p.s.i.a. to provide acceptable performance under sea level conditions, it will incur a performance penalty under altitude conditions. This performance penalty is caused by shock waves in the turbine nozzle and also losses due to the misalignment of the nozzle exit relative flow vector with respect to the turbine blade inlet angle.

It is in this background that the present device provides a system to vary the expansion ratio in the nozzles and the exit angle from the nozzles to compensate for changes in the turbine back pressure. A pressure sensing and flow control device is provided which varies the turbine nozzle boundary layer in response to variations in turbine back pressure from the design pressure. This change in boundary layer thickness, of course, results in an effective change in the nozzle flow area. The boundary layer thickness is controlled so that nozzle expansion ratio varies to accomplish an isentropic expansion of fluid flowing through the nozzle. The result of achieving this isentropic expansion under off design conditions is that the exit velocities of the flow stream from the nozzles are markedly increased over a turbine having a fixed expansion ratio. Also, the above mentioned flow control and pressure sensing device is constructed to maintain alignment between the nozzle exit relative flow vector and the blade inlet angle under off design conditions by providing a thicker boundary layer on one side of the nozzle than on the other, so that the effective nozzle axis angle decreases as the turbine back pressure increases.

It is, therefore, a primary object of the present invention to provide a new and improved control apparatus, in a turbine having supersonic nozzle velocities adapted to operate under varying pressure ratios, for varying the nozzle expansion ratio as the turbine pressure ratio deviates from the design pressure ratio.

Another object of the present invention is to provide a new and improved control apparatus, in a turbine adapted to operate under varying pressure ratios, for varying the nozzle expansion ratio and the nozzle exit angle in response to changes in turbine exhaust pressure to prevent shock and other losses in the turbine.

A further object of the present invention is to provide a new and improved control apparatus for a turbine having supersonic nozzle velocities adapted to operate under varying pressure ratios, for varying the nozzle exit flow direction in response to a deviation of the turbine back pressure from the design pressure.

A still further object of the present invention is to provide an apparatus of the type described above including a pressure sensing and flow pick-up probe in the turbine blade exhaust area for delivering a portion of the fluid to porous surfaces within the nozzle to vary the effective nozzle area. This embodiment is particularly suitable for impulse type turbines.

Another object of the present invention is to provide a new and improved control apparatus of the type described generally above particularly suitable for turbines of the reaction type, including a pressure sensing probe in the turbine blade exhaust area which regulates the flow of injection fluid from the nozzle inlet flow to porous surfaces within the nozzle.

A more specific object of the present invention is to provide a new and improved apparatus of the type described above for use in a turbine having supersonic nozzle velocities adapted to operate at pressure ratios lower than the design pressure ratios including a plurality of nozzles for receiving high pressure gases and converting a portion of the total head of the gas into a velocity head to produce a gas jet, each of the nozzles has diverging porous exit surfaces, and one of these surfaces has a greater porosity than the other, so that control fluid injected through these surfaces will produce a thicker boundary layer on the surface that has the greater porosity; ports adjacent the surfaces for supplying injection or control fluid through the porous surfaces; a pressure sensing probe for sensing the back or exhaust pressure in the turbine; and means responsive to the pressure sensing means for conveying the fluid to the nozzle ports to decrease the nozzle area in response to an increase in back pressure to produce shockless isentropic expansion in the turbine nozzle and to decrease the nozzle exit flow angle to maintain the nozzle exit relative flow vector coincident with the turbine blade inlet angles.

Other objects and advantages of the present invention will appear obvious from the following detailed description taken in connection with the accompanying drawings, in which:

FIG. 3 is a schematic drawing of one embodiment of the present invention, particularly suitable for impulse type turbines; and FIG. 4 is a schematic drawing of another embodiment of the present invention, particularly suitable for reaction type turbines.

Figure 1:
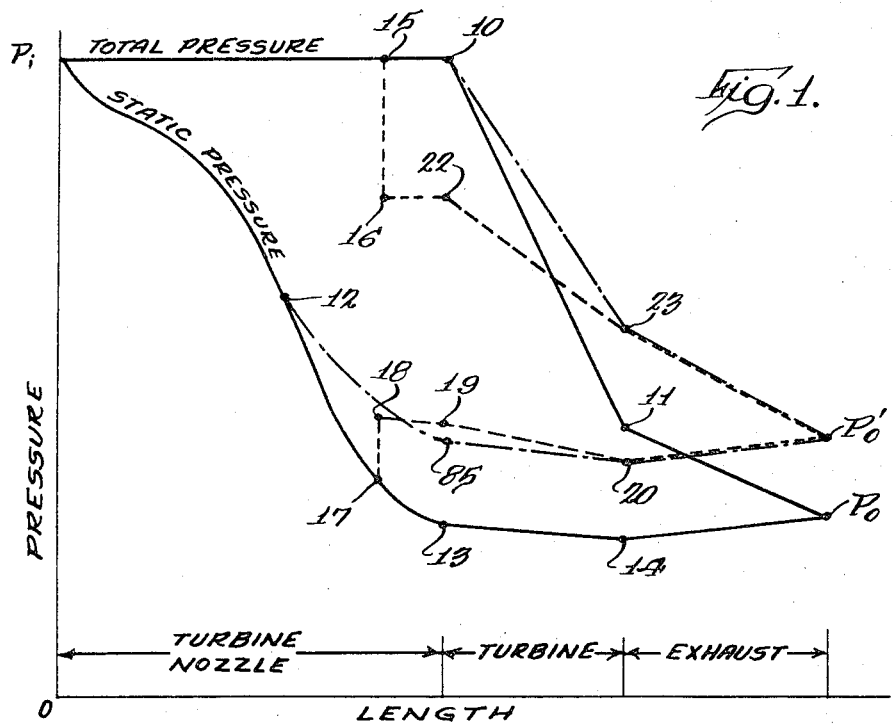
FIG. 1 is a graph showing axially developed curves for the total pressure and static pressure in the present turbine and in a conventional turbine under different pressure ratios.

While illustrative embodiments of the present invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

Referring to FIG. 1 and the curves therein, it is believed helpful for an understanding of the objectives of the present invention to view the pressure conditions of fluid flow through a conventional turbine and one with the present nozzle area control under design conditions and under off design conditions. The $x$ coordinate represents the physical axial length of the turbine and the $y$ coordinate represents the pressure of the fluid flowing through the turbine.

In the present system and in a conventional turbine, the pressure curves are the same when operating at a predetermined design pressure ratio $P_o/P_i$, as indicated by the solid line curves in FIG. 1. The total pressure through the turbine nozzle, $P_i$ to 10 is substantially constant, except for small losses. The high speed jet from the nozzles is directed against the rotating turbine blades wherein the total pressure of the fluid drops significantly, from 10 to 11, indicating a high work on the turbine blades. In the exhaust area, the total pressure drops further, from 11 to $P_o$. $P_o$ represents the final turbine exhaust pressure or back pressure. Note that the static pressure goes below the turbine exhaust pressure $P_o$ in the turbine nozzle indicating a high conversion of static pressure to fluid velocity in the nozzle. This, of course, is characteristic of an impulse type turbine. There is a small static pressure loss in the turbine blade 13 to 14, which is caused by frictional losses. Static pressure then increases slightly from the turbine blade to the final exhaust pressure $P_o$.

If a turbine is operated at a below design pressure ratio, a severe decrease in turbine performance results.

Assuming that the turbine nozzles and blades were designed for a pressure ratio $P_o/P_i$ to accommodate altitude conditions, the turbine would operate under an off design pressure ratio, illustrated by $P_o'/P_i$ in FIG. 1, under ground conditions because of the increased turbine back pressure. The pressure curves representing this off design performance with a conventional turbine is shown in evenly dotted lines in FIG. 1. In a conventional turbine, the increased back pressure $P_o'$ produces a shock wave in the turbine nozzles which results in a sudden decrease in the total pressure 15 to 16. A static pressure increase 17 to 18 also results from the shock wave in the nozzles. The static pressure decrease in the turbine blades 19 to 20 is somewhat greater than the design loss because incidence losses result in addition to the friction losses. The total pressure drop 22 to 23 across the turbine blades indicates a greatly reduced work extraction when the turbine is operating at pressure ratios below the design pressure ratio. The static and total pressure changes and the exhaust pressure are approximately the same as in the design case, as shown in FIG. 1.

Figure 2:
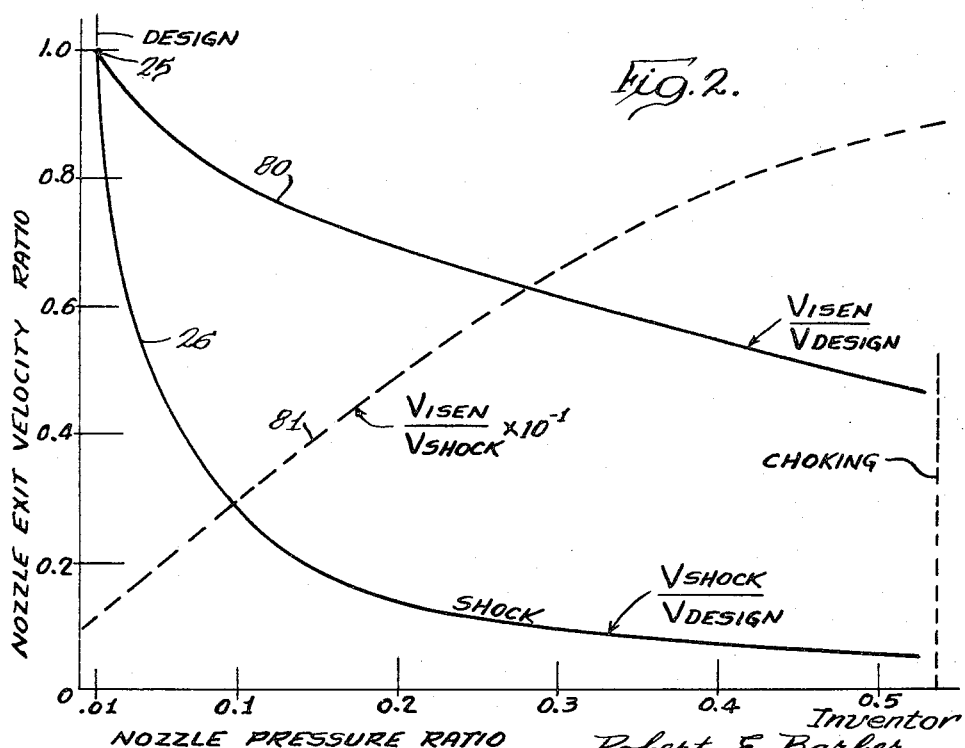
FIG. 2 is a graph showing the changes in nozzle exit velocity in the present turbine and in a conventional turbine under varying nozzle pressure ratios.

The effect of the total pressure drop caused by the shock wave in the nozzle on the nozzle exit velocity is shown more clearly in FIG. 2. In FIG. 2, the nozzle exit velocity ratio, i.e. the ratio of the actual nozzle exit velocity to the design nozzle exit velocity, is plotted against the nozzle pressure ratio, i.e. the nozzle exit static pressure to the nozzle inlet total pressure. Assuming the design nozzle pressure ratio to be approximately .01, the design point 25 indicates the operating condition where the actual nozzle exit velocity equals the design nozzle exit velocity. It may readily be seen from FIG. 2 that as the pressure ratio across a fixed geometric supersonic nozzle is decreased (numerically increased) below the design value, the nozzle exit velocity decreases rapidly, as shown in the lower shock curve 26 in FIG. 2. With the significantly lower nozzle exit velocities under the off design shock conditions, a conventional turbine will produce much less work on the turbine blades. The present device provides a means for controlling the aerodynamic walls of the nozzle thereby obviating the problems noted above and maximizing turbine performance when it is operating under off design conditions.

Referring to FIG. 3, wherein one embodiment of the nozzle flow injection system is shown particularly suitable for impulse type turbines, the characteristics of flow in a nozzle are determined by the aerodynamic walls of the channel. The aerodynamic walls of the channel are in turn determined by the physical walls and the wall boundary layer. Therefore, if the wall boundary layer can be controlled, the nozzle exit velocity and direction can be controlled. This principle is applied in the present invention by injecting fluid into the nozzle to control the flow through the nozzle.

As seen in FIG. 3, the stationary nozzle 30 is shown consisting of an upper blade 31 and a lower blade 32. While only one complete nozzle is shown for simplifying the explanation thereof, it should be understood that a plurality of nozzles are necessary. Each of the stationary nozzle blades 31 and 32 has surfaces 34 and 35 inclined with respect to the nozzle axis of symmetry 36 and defining the converging inlet portion of the nozzle. Diverging surfaces 38 and 39, symmetric about the axis of symmetry 36, define the expansion portion of the nozzle 30. Rotary turbine blades 40 are provided and are mounted on a rotatable hub (not shown) to rotate in direction 41. High pressure gas entering nozzle inlet 43 passes through the nozzle 30 reaching supersonic velocities in expansion portion 44. High velocity gas leaves the nozzles, impinges on the turbine blades 40 and passes into an exhaust area 45.

A flow injecting device 47 is provided for each of the nozzle blades and is effective to vary the boundary layer thickness in the expansion portion 44 of the nozzle. For this purpose, a control fluid inlet passage 49 in blade 31 receives controlled injection gas from a source described more fully below. Passage 49 supplies injection or control flow to ports 50 to 53 adjacent the diverging surface 38 and ports 55 to 58 adjacent surface 60 on blade 31. Surface 60 defines the lower diverging surface of the upper adjacent nozzle in the same manner as does surface 39 with respect to nozzle 43. The number of ports required is dependent on the required pressure ratio variation and nozzle size. Check valves 65 are provided for preventing the circulation of the flow from one port to another.

Surface 38 is provided with a porous surface 66 extending over the ports 50 to 53. Another porous surface 67 is provided on the surface 60 over the ports 55 to 58. The porosity of surface 67 is greater than the porosity of surface 66 for the misalignment correction described in more detail below.

It should be understood that blade 32 has an identical control flow receiving passage 70 for supplying injection fluid to porous surfaces 71 and 72. Surface 72 has a greater porosity than surface 66 and the same porosity as surface 67. In this manner the boundary layer of nozzle 43 is controlled by varying the injection flow to porous surfaces 66 and 72.

Associated with the injection flow system 47 in the nozzles is an injection flow supply and control device 75 for delivering the desired quantity of injection gas to the receiving passages, e.g. 49, 70, in the nozzles. This device includes an injection flow pick-up probe 76 fixed within the exhaust area of the turbine. The injection flow pick-up probe includes a conventional pressure probe, preferably of the total pressure type, for sensing turbine exhaust pressure. It is aligned at a suitable angle to the exhaust flow and adjusted so that a portion of the exhaust gases pass as injection fluid to the passages 49 and 70 at a flow rate proportional to the deviation of the turbine exhaust pressure from the design exhaust pressure. The injection flow pick-up probe 76 is aligned so it delivers no injection fluid to the nozzle surfaces when the turbine is operating at its design pressure ratio. As the back or exhaust pressure increases, the injection flow pick-up probe 76 will deliver injection fluid to the nozzle surfaces in proportion to the increase in turbine back pressure above the design back pressure. The sensitivity of the flow injection pick-up probe 76 and the number of ports in the nozzles are chosen so that the injection flow on the surfaces 38 and 39 produces isentropic expansion of the gases in the nozzle when the turbine is operating under off design conditions. The injection flow control device 75 is self regulating in that it regulates the injection flow of exhaust gases in response to exhaust conditions.

In operation, when the injection flow pick-up probe 76 senses an increased turbine back pressure above design, for example $P_o'$ in FIG. 1, it delivers a portion of the gas proportional to that sensed back pressure increase to receiving passages 49 and 70 in the nozzle blades 31 and 32, respectively. This flow passes through the porous surfaces 66 and 72 decreasing the nozzle aerodynamic expansion ratio, decreasing the nozzle exit velocity and obviating any shock wave in the nozzle. This boundary layer is sufficient to achieve an expansion ratio which provides isentropic shockless expansion in the nozzles.

The results of providing this isentropic expansion in the nozzle, when operating below design nozzle pressure ratios, is shown in curve 80 in FIG. 2 which represents the nozzle exit velocity ratio for below design nozzle pressure ratios when employing the present injection flow control device. It may readily be seen that the nozzle exit velocities under lower than design pressure ratios, while below the design velocity, are considerably above those produced in a conventional turbine indicated by shock curve 26. While isentropic curve 80 represents the maximum possible shockless exit velocity, in actual practice these values can be approached. Therefore, large increases in nozzle exit velocity can be obtained with the present injection flow system providing variable nozzle expansion ratios. This shockless velocity increase effects the turbine work, since the turbine changes the momentum of the gas stream. For example, if the isentropic exit velocity is four times the shock exit velocity, the turbine work would be approximately four times as large. The ratio of isentropic exit velocity to the shock exit velocity is exemplified by the curve 81 in FIG. 2, and as may be noted therein, this ratio can be well above four.

Referring again to the pressure curves in FIG. 1, the advantages of employing the present injection flow are further illustrated. Assuming again, an increase in back pressure above the design back pressure $P_o$ to pressure $P_o'$, the present device using injection flow will decrease the nozzle expansion ratio so that the static pressure follows the curve $P_i$, 12, 85, 20 and $P_o'$. The static pressure drop 85 to 20 in the turbine blades is less than 19 to 20, in a conventional turbine, because only frictional losses occur. The total pressure curve through the turbine, with the present injection flow, is represented by curve $P_i$, 10, 23 and $P_o'$. It should be noted that there is no shock loss of total pressure in the nozzle, and that the total pressure drop 10 to 23 in the blades is much greater than the total pressure drop 22 to 23 in a conventional turbine, indicating a high work extraction with the present injection flow system.

As noted, above, the porosity of surface 72 is greater than the porosity of surface 66, so that the boundary layer thickness on the surface 72 will always be proportionally greater than the boundary layer thickness on surface 66. The purpose of this is to prevent losses which normally occur in turbines due to the misalignment of the flow stream from the nozzles with respect to the turbine blade inlet angles. In a conventional turbine, as the back pressure on the turbine increases, causing a below design pressure ratio, the speed of the turbine decreases, but the nozzle exist flow stream angle remains constant. This results in a change in angle of the nozzle exit relative flow vector with respect to the turbine blade inlet angle which produces an obvious loss. By injecting a majority of the injection flow to the lower nozzle surfaces 67 and 72, as shown in FIG. 3, the nozzle exit flow stream is turned more in the direction of rotation of the turbine blades to maintain coincidence between the nozzle exit relative flow vector and the turbine blade inlet angle.

Referring to FIG. 4, another embodiment of the present invention is shown which is particularly suitable for turbines which tend toward the reaction type, i.e. a turbine which has a lower turbine exhaust total pressure than the nozzle exit static pressure. This embodiment is similar to the FIG. 3 embodiment except that it is not self regulating. In FIG. 4, like reference numerals have been used to designate like parts with the FIG. 3 embodiment.

An injection flow pick-up probe 110 is provided in a high pressure region, preferably at the nozzle inlet, as shown in FIG. 4. The amount of flow injected through the pick-up probe 110 is regulated and controlled by a variable valve 111. The valve 111 is responsive to and regulated by a pressure sensing device 112 fixed in the turbine exhaust area so that it is sensitive to exhaust pressure. The valve 111 may be either pressure or electrically operated, and is adjusted so that when the pressure sensing device 112 senses design exhaust pressure, the valve will be closed, preventing flow to the receiving passages 49 and 70. As the pressure sensing device 112 senses an increase in exhaust pressure above design, the valve 111 and the pressure sensing device 112 are constructed to begin opening, permitting flow through the probe 110 to the nozzle receiving passages 49 and 70 in proportion to the deviation of exhaust pressure from design exhaust pressure. The valve regulation and ports are arranged so that as the back pressure increases, the boundary layers on surfaces 66 and 72 will maintain isentropic expansion in the nozzle 30 in the same manner as the FIG. 3 embodiment.

Furthermore, as nozzle surface 72 is more porous than surface 66, the FIG. 4 embodiment has a similar flow stream misalignment correction to the FIG. 3 embodiment.

I claim:

1. In a turbine having stationary nozzles, rotating turbine blades and an exhaust portion for receiving fluid exhausted from the blades, the improvement comprising; a plurality of nozzles adapted to direct fluid to the turbine blades, and means responsive to the pressure of the fluid in the exhaust portion of decreasing the area of said nozzles in response to an exhaust pressure increase.

2. In a turbine driven by a compressible fluid and adapted to operate at varying back pressures, the combination comprising; a plurality of nozzles having a diverging expansion portion, said nozzles having surfaces designed for a predetermined pressure ratio, a plurality of rotatable turbine blades adjacent thereto, and means responsive to the pressure of the fluid exhausting from the blades for varying the boundary layers in each nozzle diverging portion to minimize shock losses in the nozzle caused by off design pressure ratios.

3. In a turbine having supersonic nozzle velocities and adapted to operate at varying back pressures, the improvement comprising: a plurality of nozzles for receiving high pressure fluid and converting a portion of the total fluid head into a velocity head to produce fluid jets, each of said nozzles having fixed diverging surface portions adjacent their exist ends, said surfaces having a shape to accommodate a fixed turbine pressure ratio, said nozzles having means therein for admitting a control fluid to said surfaces for varying the nozzle area by varying the boundary layer on said surfaces, a plurality of turbine blades rotatably mounted adjacent said nozzles and adapted to receive the fluid jets from said nozzles, pressure sensing means for sensing the back pressure in said turbine, and means responsive to said pressure sensing means for conveying fluid to said nozzle admitting means to vary the nozzle area, said responsive means being constructed to decrease nozzle area in response to an increase in back pressure to produce shockless isentropic expansion in the nozzles when the turbine is operating at pressure ratios differing from the design pressure ratio.

4. In a turbine as defined in claim 3, wherein said nozzle surfaces include a first surface and a second surface, said admitting means including means for directing a greater flow of control fluid to one of said surfaces than the other of said surfaces to vary the jet direction as the turbine back pressure varies.

5. In a turbine as defined in claim 4, wherein said admitting means directs the major portion of the control fluid to the nozzle surface adjacent the trailing turbine blades so that as the back pressure increases with the resulting decrease in nozzle exit velocity the effective nozzle angle will decrease and the nozzle exit relative flow vector will be coincident with the turbine blade entrance angle.

6. In a turbine adapted to operate at varying back pressures, the combination comprising; a plurality of turbine nozzles adapted to direct fluid about a predetermined axis, a plurality of blades rotatable adjacent the nozzles and adapted to receive fluid therefrom, each of said blades having a predetermined inlet angle, and means responsive to varying turbine back pressure associated with said nozzles for varying said predetermined axis to maintain alignment between the nozzle exit flow relative to the turbine blade inlet.

7. In a turbine as defined in claim 6, wherein said means for varying said nozzle axis includes port means in the nozzles for directing a control fluid to the nozzle surfaces to vary the boundary layer within the nozzles, and means responsive to the turbine blade exhaust fluid conditions for directing control fluid to said port means.

8. In a turbine as defined in claim 7, wherein said nozzles each include a first surface facing the approaching blades, a second surface facing the leaving blades, said port means including ports in said nozzle adjacent said second surface, said second surface being porous to admit control fluid to said surface to control the adjacent boundary layer.

9. In a turbine as defined in claim 3, wherein said pressure sensing means and said means responsive to the pressure sensing means includes a pressure sensing flow pick-up probe fixed in the turbine blade exhaust flow and adapted to deliver a portion of said exhaust flow to said nozzles as control fluid; said probe being responsive to back pressure to deliver varying flow rate of fluid to said nozzle so that as the back pressure increases the probe delivers greater flow.

10. In a turbine as defined in claim 3, wherein said means responsive to said pressure sensing means includes a flow pick-up probe adjacent the inlet of said nozzles, conduit means for conveying a portion of the nozzle inlet flow to said nozzle surfaces as control fluid, and a regulation valve in said conduit means responsive to said pressure sensing means for preventing the flow of control fluid when the turbine is operating at a design pressure ratio and increasing the flow of control fluid as turbine exhaust pressure increases.

11. In a turbine adapted to operate at varying back pressures, the combination comprising; a plurality of turbine nozzles, each said nozzle having a predetermined flow axis and expansion ratio, a plurality of turbine blades adjacent said turbine nozzles for receiving fluid flow therefrom, and means responsive to pressure in the turbine exhaust for varying said flow axis to maintain substantial coincidence between the nozzle exit relative flow and the turbine blade inlet and said expansion ratio to prevent shock in the nozzles.

12. In a turbine adapted to operate at varying back pressure, the combination comprising; a plurality of turbine nozzles, each said nozzle having a predetermined flow axis and expansion ratio, a plurality of turbine blades adjacent said turbine nozzle for receiving fluid flow therefrom, means responsive to changes in fluid flow conditions for varying said flow axis and said expansion ratio, said means for varying the flow axis and expansion ratio including first and second porous surfaces in each of said nozzles, one of said surfaces having a greater porosity than the other, port means for simultaneously admitting a control fluid to said porous surfaces to vary the boundary layer adjacent each of said surfaces, pressure sensing means for sensing turbine exhaust pressure changes, and means responsive to said sensing means for conveying control fluid to said port means to vary nozzle area and exit angle in response to changing turbine back pressure.

References Cited

UNITED STATES PATENTS

| | | | |
|---|---|---|---|
| 2,095,991 | 10/1937 | Lysholm | 60—39.25 X |
| 2,625,789 | 1/1953 | Starkey | 60—39.25 X |
| 2,825,532 | 3/1958 | Kadosch et al. | 253—78 |
| 2,977,768 | 4/1961 | Wagner et al. | |
| 2,885,856 | 5/1959 | Pedersen | 230—122 X |
| 2,944,729 | 7/1960 | Foley et al. | 230—122 |

FOREIGN PATENTS

| | | |
|---|---|---|
| 927,662 | 5/1947 | France. |
| 952,321 | 5/1949 | France. |
| 619,722 | 3/1949 | Great Britain. |
| 736,003 | 8/1955 | Great Britain. |
| 1,159,688 | 2/1958 | France. |

EVERETTE A. POWELL, JR., *Primary Examiner.*